(12) United States Patent
Wachter

(10) Patent No.: US 12,574,591 B2
(45) Date of Patent: Mar. 10, 2026

(54) SYSTEM AND METHOD FOR PROVIDING ENHANCED AUDIO FOR STREAMING VIDEO CONTENT

(71) Applicant: Sound United LLC, Carlsbad, CA (US)

(72) Inventor: Martin Richard Wachter, Phoenix, MD (US)

(73) Assignee: SOUND UNITED LLC, Carlsbad, CA (US)

( * ) Notice: Subject to any disclaimer, the term of this patent is extended or adjusted under 35 U.S.C. 154(b) by 148 days.

(21) Appl. No.: 18/275,784

(22) PCT Filed: Feb. 2, 2022

(86) PCT No.: PCT/US2022/014875
§ 371 (c)(1),
(2) Date: Aug. 3, 2023

(87) PCT Pub. No.: WO2022/169819
PCT Pub. Date: Aug. 11, 2022

(65) Prior Publication Data
US 2024/0298066 A1 Sep. 5, 2024

Related U.S. Application Data

(60) Provisional application No. 63/245,987, filed on Sep. 20, 2021, provisional application No. 63/146,202, filed on Feb. 5, 2021.

(51) Int. Cl.
*H04N 21/439* (2011.01)
*H04N 21/233* (2011.01)
(Continued)

(52) U.S. Cl.
CPC ......... *H04N 21/439* (2013.01); *H04N 21/233* (2013.01); *H04N 21/235* (2013.01); *H04N 21/8106* (2013.01)

(58) Field of Classification Search
CPC .. H04N 21/439; H04N 21/233; H04N 21/235; H04N 21/8106; H04N 21/4852;
(Continued)

(56) References Cited

U.S. PATENT DOCUMENTS 4,489,432 A 12/1984 Polk
4,497,064 A 1/1985 Polk
(Continued)

OTHER PUBLICATIONS

Extended European Search Report for EP 22750290.3, dated Nov. 13, 2024.
(Continued)

*Primary Examiner* — Adil Ocak
(74) *Attorney, Agent, or Firm* — Nieves IP Law Group, LLC; Peter A. Nieves

(57) ABSTRACT

A system (400) for providing an audio profile for streaming video, includes an audio profile subsystem (433) that receives audio mix data and synchronizes audio data in an audio profile. A streaming service video streaming server (420) receives video data, uncompressed audio data synchronized with audio tracks, and the audio profile. An audio profile server (430) is configured to receive the audio profile and dynamic range compression descriptors to produce audio profile metadata. An audio reproduction system (410) receives audio profile metadata and listening environment parameters to adjust audio parameters based on the audio rendering system characteristics and a listening environment of the audio rendering system. The audio parameters include one or more of equalization, a filter, a rendering delay, and volume.

20 Claims, 14 Drawing Sheets

(51) Int. Cl.
    *H04N 21/235*       (2011.01)
    *H04N 21/81*        (2011.01)

(58) Field of Classification Search
    CPC .. H04N 21/6547; H04S 2400/11; H04S 7/301
    USPC ........................................................ 725/116
    See application file for complete search history.

(56) References Cited

U.S. PATENT DOCUMENTS

| | | | |
|---|---|---|---|
| 4,569,074 A | 2/1986 | Polk | |
| 4,594,729 A | 6/1986 | Weingartner | |
| 4,638,505 A | 1/1987 | Polk et al. | |
| 4,759,066 A | 7/1988 | Polk et al. | |
| 4,888,804 A | 12/1989 | Gefvert | |
| 5,553,149 A | 9/1996 | Freadman | |
| 6,490,359 B1 | 12/2002 | Gibson | |
| 6,937,737 B2 | 8/2005 | Polk, Jr. | |
| 7,231,053 B2 | 6/2007 | Polk, Jr. | |
| 7,817,812 B2 | 10/2010 | Polk, Jr. et al. | |
| 9,185,490 B2 | 11/2015 | Starobin | |
| 9,226,091 B2 | 12/2015 | Lyons et al. | |
| 9,374,640 B2 | 6/2016 | Starobin | |
| 10,070,244 B1 | 9/2018 | Dabney | |
| 10,327,064 B2 | 6/2019 | Starobin | |
| 10,327,086 B2 | 6/2019 | Orth et al. | |
| 10,412,523 B2 * | 9/2019 | Mehta | H04S 7/30 |
| 11,937,066 B2 | 3/2024 | Starobin et al. | |
| 12,120,494 B2 | 10/2024 | Orth | |
| 2006/0170778 A1 * | 8/2006 | Ely | H04N 21/25875 |
| | | | 725/148 |
| 2009/0123007 A1 | 5/2009 | Katayama | |
| 2009/0175476 A1 | 7/2009 | Bottum | |
| 2011/0216925 A1 | 9/2011 | Riggs et al. | |
| 2015/0016642 A1 | 1/2015 | Walsh et al. | |
| 2016/0149547 A1 | 5/2016 | Rider et al. | |
| 2016/0286167 A1 * | 9/2016 | Clavel | H04N 7/15 |
| 2020/0221240 A1 | 7/2020 | Pye et al. | |
| 2020/0401369 A1 * | 12/2020 | Sabin | H04B 17/309 |

OTHER PUBLICATIONS

Tortosa, et al: "Acoustic Positioning System for 3D Localization of Sound Sources Based on the Time of Arrival of a Signal for a Low-Cost System" Engineering Proceedings; Eng. Proc. 2021, 10, 15. https://doi.org/10.3390/ecsa-8-11307; Multidisciplinary Digital Publishing Institute; Nov. 1, 2021.

* cited by examiner

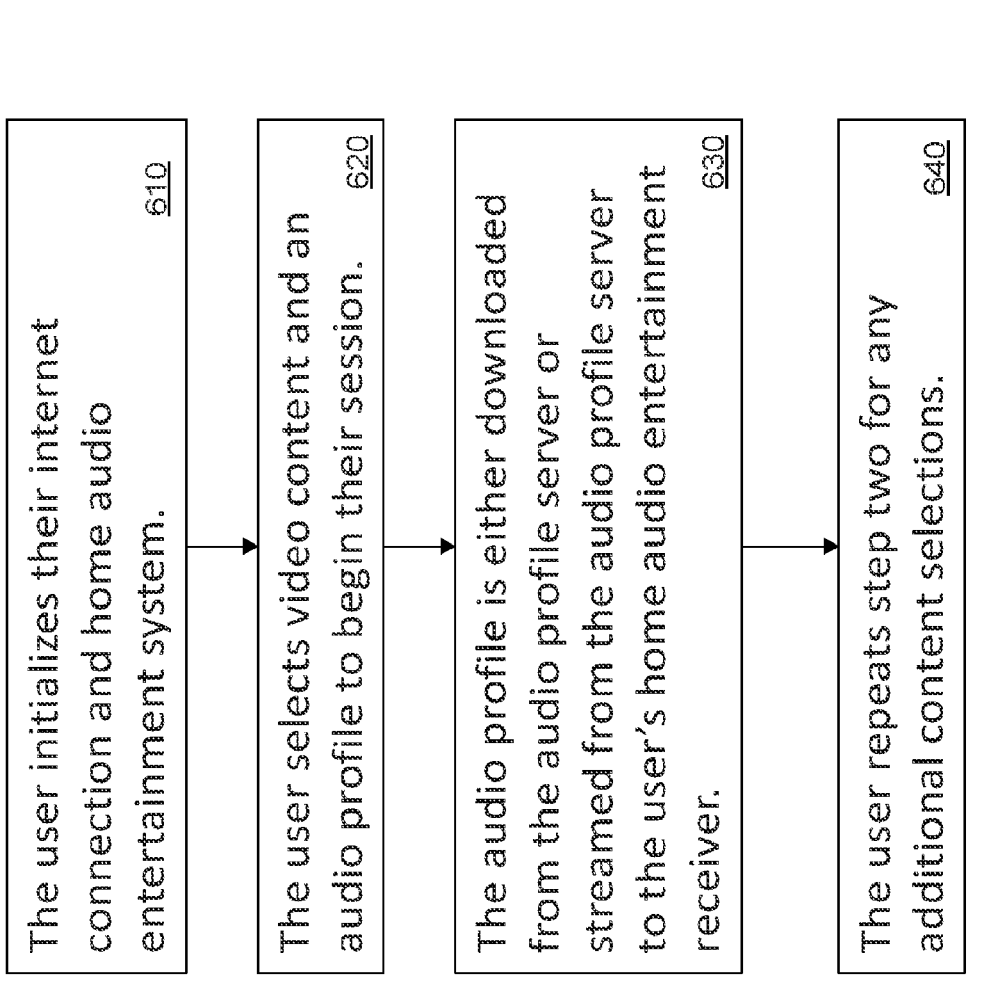

600

The user initializes their internet connection and home audio entertainment system.    610

The user selects video content and an audio profile to begin their session.    620

The audio profile is either downloaded from the audio profile server or streamed from the audio profile server to the user's home audio entertainment receiver.    630

The user repeats step two for any additional content selections.    640

FIG. 6

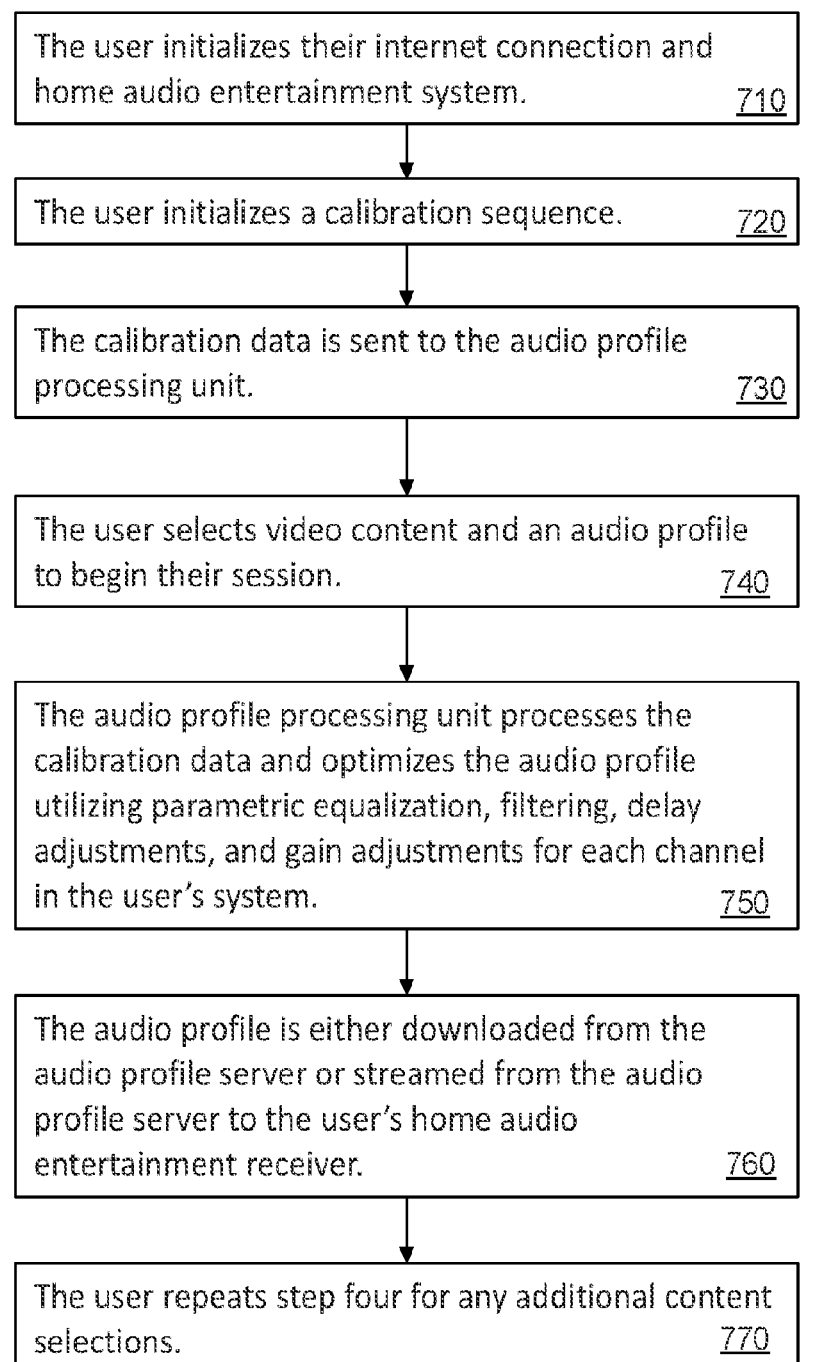

The user initializes their internet connection and home audio entertainment system.        710

The user initializes a calibration sequence.        720

The calibration data is sent to the audio profile processing unit.        730

The user selects video content and an audio profile to begin their session.        740

The audio profile processing unit processes the calibration data and optimizes the audio profile utilizing parametric equalization, filtering, delay adjustments, and gain adjustments for each channel in the user's system.        750

The audio profile is either downloaded from the audio profile server or streamed from the audio profile server to the user's home audio entertainment receiver.        760

The user repeats step four for any additional content selections.        770

AUDIO RENDERER MASTER FILE

XML HEADER INFORMATION

3D POSITIONAL DATA FOR AUDIO RENDERER 1 (SPECIFIC)

3D POSITIONAL DATA FOR AUDIO RENDERER 2 (SPECIFIC)

3D POSITIONAL DATA FOR AUDIO RENDERER N (SPECIFIC)

830

DOLBY ATMOS MASTER FILE

XML HEADER INFORMATION

3D POSITIONAL DATA (GENERIC)

AUDIO DATA (PCM)

918

AUDIO PROFILE

XML HEADER INFORMATION — 1210

FLOOR CHANNELS — 1220

HEIGHT CHANNELS — 1230

SUBWOOFER CHANNELS — 1240

DISTANCE — 1250

LEVELS — 1260

EQs — 1270

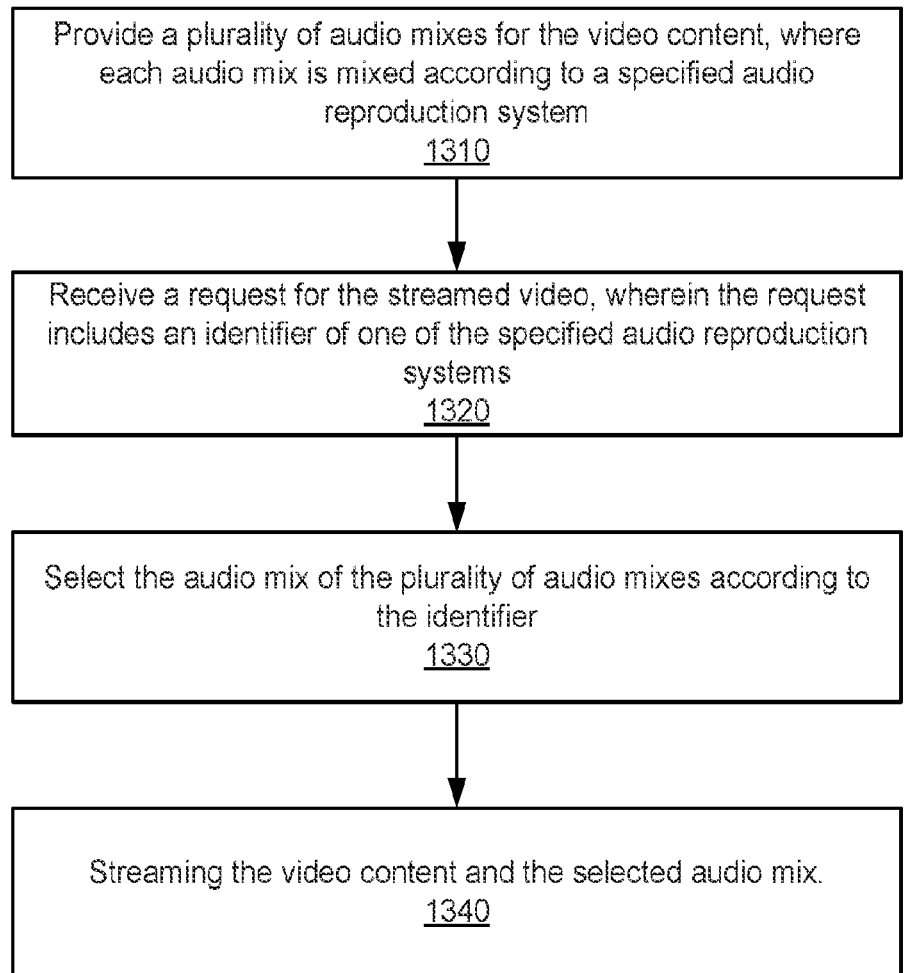

Provide a plurality of audio mixes for the video content, where each audio mix is mixed according to a specified audio reproduction system
1310

Receive a request for the streamed video, wherein the request includes an identifier of one of the specified audio reproduction systems
1320

Select the audio mix of the plurality of audio mixes according to the identifier
1330

Streaming the video content and the selected audio mix.
1340

SYSTEM AND METHOD FOR PROVIDING ENHANCED AUDIO FOR STREAMING VIDEO CONTENT

CROSS-REFERENCE TO RELATED APPLICATIONS

This application is the National Stage of International Application No. PCT/US2022/014875, filed Feb. 2, 2022, which claims the benefit of U.S. Provisional Patent Application Ser. No. 63/146,202, filed Feb. 5, 2021, entitled "Audio Profiles for Providing Enhanced Rendering of Streaming Video Content," and U.S. Provisional Patent Application Ser. No. 63/245,987, filed Sep. 20, 2021, entitled "Audio Profiles for Providing Enhanced Rendering of Streaming Video Content," each of which is incorporated by reference herein in its entirety.

FIELD OF THE INVENTION

The present invention relates to media streaming, and more particularly, is related to providing high resolution audio for streaming video.

BACKGROUND OF THE INVENTION

State of the art 4K HDR/HDR10/HDR10+/Dolby Vision video content along with compressed Dolby Atmos audio (eAC3) is readily available for streaming from content providers, for example, like HBO Max, Netflix, Amazon Prime, Apple, and Disney, among others. State of the art 4K streaming video players are readily available from the companies such as Apple, Amazon, Vudu, and Roku, among others. However, currently streaming services do not offer their customers the best possible audio quality and features. Commercially available lossless audio content is available on physical Blu-ray discs, the only platform to provide full bitrate (non compressed) Dolby Atmos content encapsulated in the Dolby TrueHD format. However, for several reasons using physical discs that can provide the best audio and video content, is not as convenient as using streaming content. In addition, downloading content is not as easy as streaming on-demand content. However, Dolby TrueHD content is very high bandwidth, and many consumer devices lack the ability to properly decode Dolby TrueHD formatted audio, so most users are constrained from streaming this content, for example, by existing internet speed limitations and/or data caps. Streaming services instead send compressed multi-channel audio because it uses less bandwidth than uncompressed multi-channel audio.

Likewise, although 8K displays are readily available and prices are beginning to decline, there is very little 8K content available to consumers. Users desiring to experience high quality audio for streamed video have resorted to creating their own highly technical solutions based on customized Android video players which are capable of passing through uncompressed audio to the local audio system, (example are sound bars and audio video receivers (AVRs) with any number of connected speakers), locally based network attached storage (NAS) systems, time consuming ripping or downloading, cataloging, naming, and customized remote control solutions and specific audio and video equipment in order to achieve a high quality sound and video experience.

Continuity of control across devices in the theater experience is not coordinated unless the system is installed, programmed, and maintained by a costly professional installer who will calibrate the audio and video components and optimize them for the end user's listening environment.

Commercially available content streaming devices like Roku, FireTV, AppleTV and Android TV are readily available but likewise do not deliver sufficiently high quality audio and video content to their consumers. Kaleidescape offers a subscription service for purchasing and then downloading 4K/TrueHD content to their proprietary players and local storage systems. Each of these systems, includes one or more of the following limitations:

Content is purchased and downloaded, not streamed.

Content must be downloaded before it can be played so browsing and previewing the content is not the same experience provided by Netflix or any streaming service.

Massive amounts of local storage are required to store purchased movie content.

Competition with commercial steaming services.

Lagging behind the latest technology, for example by several years, and not supporting current protocols, such as Dolby Vision for example.

Technology is not upgradable, forcing users to purchase new expensive hardware to stay current.

Not available at retail. The system has to be purchased from a specialty dealer/installer.

Hardware must be purchased, and pricing starts at $5500 USD.

Additional storage must be purchased to expand beyond the initial system capacity compared to unlimited capacity via streaming.

Audio content is the same for all consumers and not optimized for any particular rendering hardware such as a sound bar or AVR or specifically optimized for any particular listening environment.

Audio content that is adjusted for the end user's specific audio rendering system and listening environment occurs on the already compressed audio streams delivered from the streaming services.

Therefore, there is a need in the industry to address one or more of the abovementioned issues.

SUMMARY OF THE INVENTION

Embodiments of the present invention provide a system and method for providing enhanced audio for streamed video content. Briefly described, the present invention is directed to a system (400) for providing an audio profile for streaming video. An audio profile subsystem (433) receives audio mix data and synchronize audio data in an audio profile. A streaming service video streaming server (420) receives video data, uncompressed audio data synchronized with audio tracks, and the audio profile. An audio profile server (430) is configured to receive the audio profile and dynamic range compression descriptors to produce audio profile metadata. An audio reproduction system (410) receives audio profile metadata and listening environment parameters to adjust audio parameters based on the audio rendering system characteristics and a listening environment of the audio rendering system. The audio parameters include one or more of equalization, a filter, a rendering delay, and volume.

Other systems, methods and features of the present invention will be or become apparent to one having ordinary skill in the art upon examining the following drawings and detailed description. It is intended that all such additional systems, methods, and features be included in this description, be within the scope of the present invention and protected by the accompanying claims.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principals of the invention.

FIG. 6 is a flowchart for a first exemplary method embodiment for Audio Profile Distribution.

FIG. 7 is a flowchart for a second exemplary method embodiment for Audio Profile Distribution.

FIG. 13 is a flowchart for an exemplary method embodiment for providing streamed audio content to accompany streamed video content according to an audio profile.

DETAILED DESCRIPTION

Figure 1:
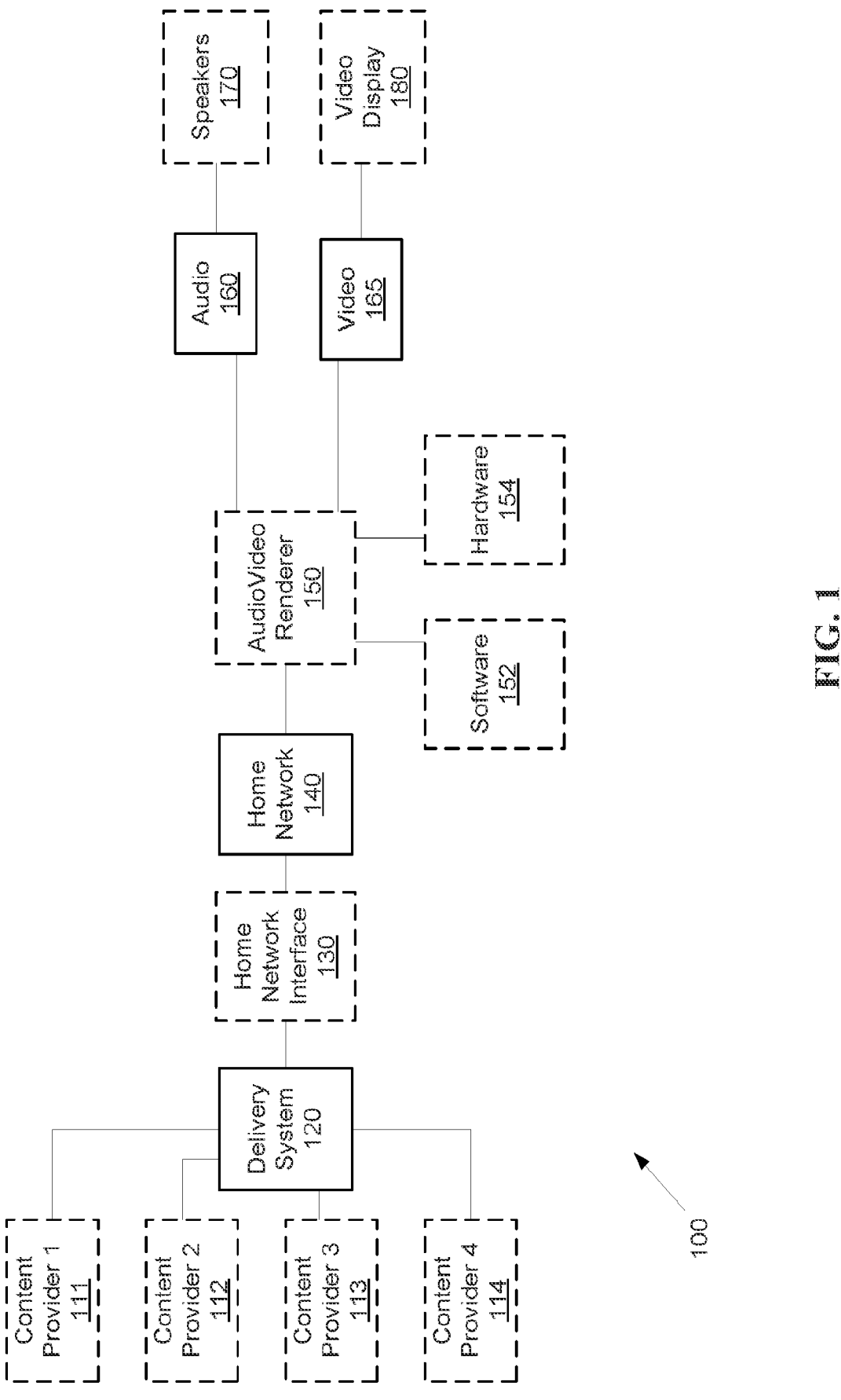
FIG. 1 is a schematic diagram showing an exemplary audio/video system.

Reference will now be made in detail to embodiments of the present invention, examples of which are illustrated in the accompanying drawings. Wherever possible, the same reference numbers are used in the drawings and the description to refer to the same or like parts.

As used within this disclosure, "equalization" generally refers to the process of adjusting the volume of different frequency bands within an audio signal. For example, equalization may include analog and/or digital processing of an audio signal to change the amplitude of portions of the audio spectrum. For example, a graphic equalizer generally provides controls to boost and cut the amplitude of fixed pre-selected audio bands, while a parametric equalizer may allow the user to select one or more frequency bands and bandwidths ("Q") to boost or cut. Other types of equalization are also known.

As used within this disclosure "streaming a file" refers to transmitting data in an audio/video file from a streaming server to a home audio/video rendering system such that the audio/video rendering system may render the received audio/video content as it is received (for example, with appropriate buffering) without waiting to receive the entire audio/video file.

Exemplary embodiments of the present invention provide a high-quality audio experience to accompany streaming video services. For example, a specialized audio profile may be created that allows playback of audio that sounds like what the creator originally intended. In addition, the audio profile may be adapted based on the specific criteria of the environment of the user, including room characteristics, and available equipment, for example. The audio profile may be selected on demand by the user on a pay-per-use basis or subscription-based model, then downloaded onto equipment in the location of the user or streamed from a cloud-based service.

A system implementing aspects of the invention is shown in the FIG. 1. The system 100 generally includes audio/video content provided by content providers 111-114. The audio/video content is received by a delivery system that communicates with an Audio/Video rendering system such as a sound bar or AVR 150 in a home network 140 via a home network interface 130, for example, a cable modem and/or access point to a wireless local area network. The audio rendering system 150 includes a software portion 152 having an operating system hosting audio and video decoders, for example, executing digital signal processing (DSP) algorithms and providing a security layer. The audio rendering system 150 includes a hardware portion 154 hardware, for example a CPU/GPU providing processing and input/output (I/O) functionality. The audio rendering system 150 includes one or more audio amplifiers, speaker interconnects, and a control system. The audio rendering system 150 may also include audio and video switching capabilities to select different source devices for playback, for example, HDMI inputs. The audio rendering system provides audio 160 to speakers 170, and video 165 to a video display device 180. The audio rendering system provides a means to calibrate each channel of audio via a microphone input device and software DSP algorithms to optimize the playback of audio by applying specific equalization, filters, and adjustable delay based on room calibration features available to the user or installer, for example, such as Audyssey or Dirac Live room correction software.

Figure 2:
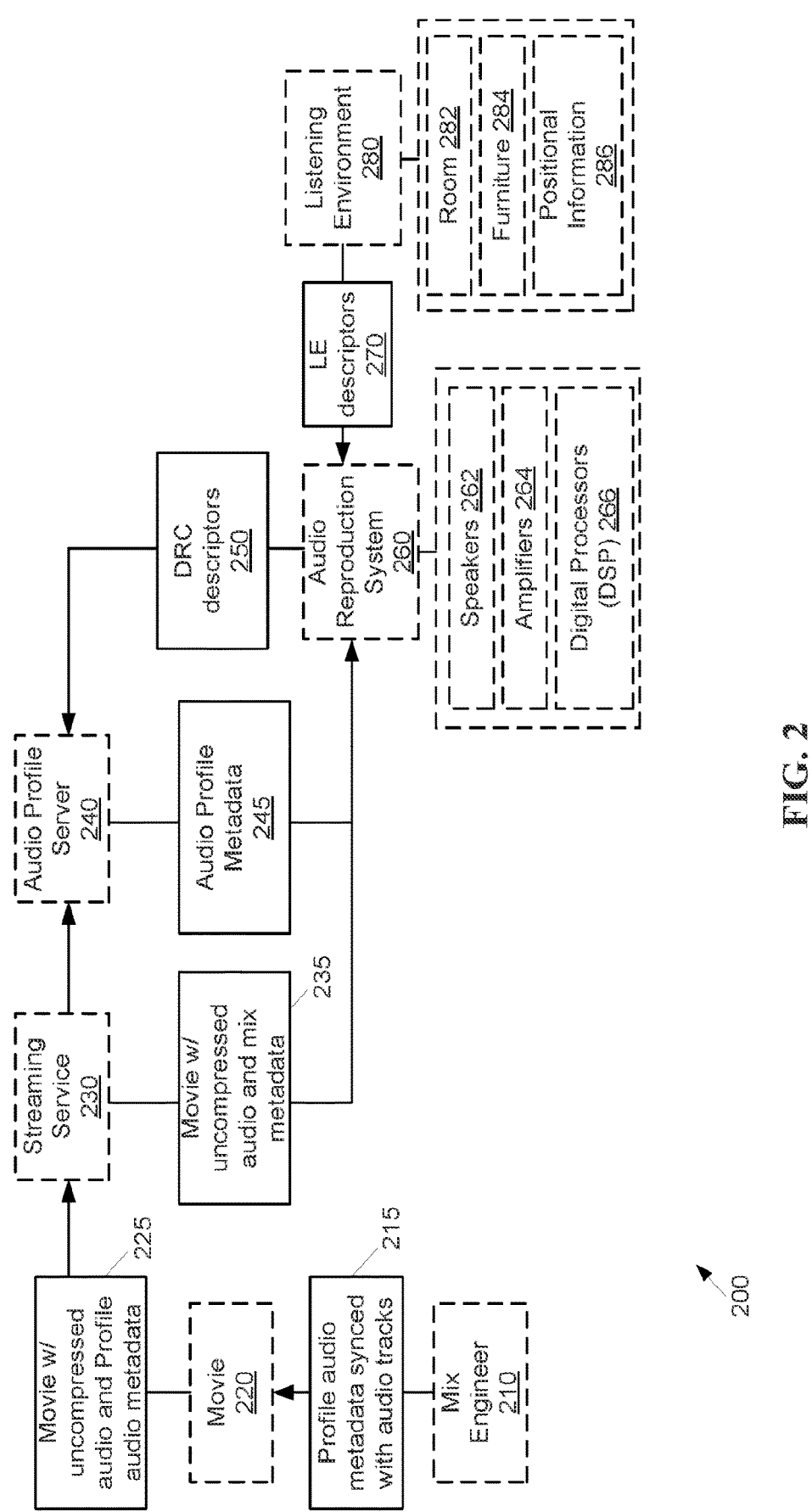
FIG. 2 is a schematic diagram of a system and process to create, deliver, and apply an audio profile to any given media rendering system according to a first exemplary embodiment.

FIG. 2 shows a system and process to create, deliver, and render an audio profile according to a first exemplary embodiment. The first embodiment includes an upgradable and performance optimized cloud connected system with the hardware capacity to be improved after purchase by software enhancements which are developed and sold over the entire life of the product. A cloud connected proprietary system is configured to unlock exclusive entertainment experiences. This platform enables exclusive content and proprietary experiences that are created by film and recording studios in partnership with the system provider.

A mix engineer 210 produces a mix for audio accompanying video content (movie 220) according to audio profile synchronized with audio tracks 215. The resulting movie with uncompressed audio and audio profile metadata 225 is provided to a streaming service 230. DRC descriptors 250 (described below) are provide to the audio profile server, such that selected content including the movie with uncompressed audio and mix metadata 235 and audio profile metadata 245 is streamed to an audio reproduction (rendering) system 260 in the home of a user. The audio reproduction system 260 may include, for example a plurality of speakers 262, amplifiers 264, and digital processors 266, and an audio/video switching device 267. As described further below, the audio reproduction system 260 may receive listening environment descriptors 270 used to configure the audio reproduction system 260 according to the listening environment 280, for example, the room 282 of the audio reproduction system 260, including furniture 282 and positional information 286 of the system components.

In contrast with current state of the art in home theater sound quality is described in the Background section, the end user may subscribe to one or more streaming services 230 that offer a high quality tier of service that leverage the exemplary embodiments described herein. For example, at the time of this writing, Netflix offered 4K/Atmos streaming content in their "Ultra HD" streaming plan for end users having a Netflix player capable of passing Atmos content and set to "High" quality and a Dolby Atmos capable audio system such as a sound bar or AVR, such as from Denon, Marantz, Polk, Definitive, Bowers & Wilkins, among others. Dolby Atmos is a surround sound format that provides the listener with an immersive 3D surround sound effect, as if the sound is coming from many directions. The version of Atmos content coming from the streaming service is generally not the best quality available. This is not ideal, as the audio is a compressed version that is created to reduce the bandwidth requirements for delivery over the Internet.

The compressed audio represents trade-offs between quality and bandwidth, generally sacrificing audio quality for reduced bandwidth. The compressed audio is generally of lesser quality than the original audio the mix engineer 210 heard as she/he created the audio soundtrack for the video content 220 that is streamed to the end user in their home. Since the mix engineer cannot know what audio rendering system is available in the customer's home, so the mix engineer instead mixes to a typical baseline assumed user rendering system, corresponding to a generic audio output profile that is compatible with almost any generic audio rendering system.

Streaming services generally provide the same audio stream to each subscriber regardless of what audio rendering system the user actually has. For example, a first user having a $100 sound bar with only two speakers and a second user having a $1,000,000 custom home theater system with a full 9.1.6 Atmos speaker system typically receives same audio stream from the streaming service.

To further enhance the quality of sound in the home theater, the audio renderer (a sound bar or AVR for example) may utilize room correction software such as Audyssey https://audyssey.com/or Dirac Live https://www.dirac.com/live/. This software may be used to determine the acoustical characteristics of the listening environment of the end user, which may include the room itself, the audio rendering hardware and software (amplifiers, A/V switching, audio path, audio decoders) and the speakers that reproduce the sound. The software performs room calibration using a microphone to listen to test tones played through the audio rendering system to determine the acoustical properties of the room. The software then applies software algorithms based on the specific audio rendering system in use to compensate for acoustical deficiencies in the room. These technologies may adjust parameters in the audio signal, for example, equalization, delay timing, and volume for each speaker in the room. For such systems, the same room corrections are applied to all playback material. In particular, there is no relationship between the content from the streaming service and the room correction software.

The present embodiments fill this gap by creating a relationship between the original uncompressed audio tracks available only to the mix engineer at the time of mastering and the audio rendering system available in the home of the end user at the time of playback.

Audio profiles described by the present embodiments offer an improved user listening experience by providing consumable video streams containing one or more of multiple audio mixes targeted to specific audio rendering systems. One or more optimizations for specific audio renderers, for example, specific sound bars or AVRs, can be mixed with the video content in addition to or instead of the generic 7.1.4 output which is intended for playback on any general audio renderer.

Advantageously, audio customizations may be applied during the mix, so the audio enhancements are applied to the uncompressed audio. This result can not be accomplished in the home of the end user as the audio renderer generally only has access to a compressed audio stream.

Once the audio streams have arrived at the home of the user, the audio renderer may further optimize the streams to characteristics of the listening environment by using onboard room correction software of the audio rendering system, as described previously.

Audio Profiles may be created by the manufacturer of the rendering system and tailored to specific capabilities of the audio rendering system. The configurations may include system capability data, for example how many channels of processing are available, and other system resources such as the range of audio playback delay times per transducer (typically limited by system memory), what filters and EQs may be applied, what decoders are available, and what room correction software is available for each audio renderer. Other capabilities may be included as well, depending on the specific features of the audio renderer.

Figure 8:
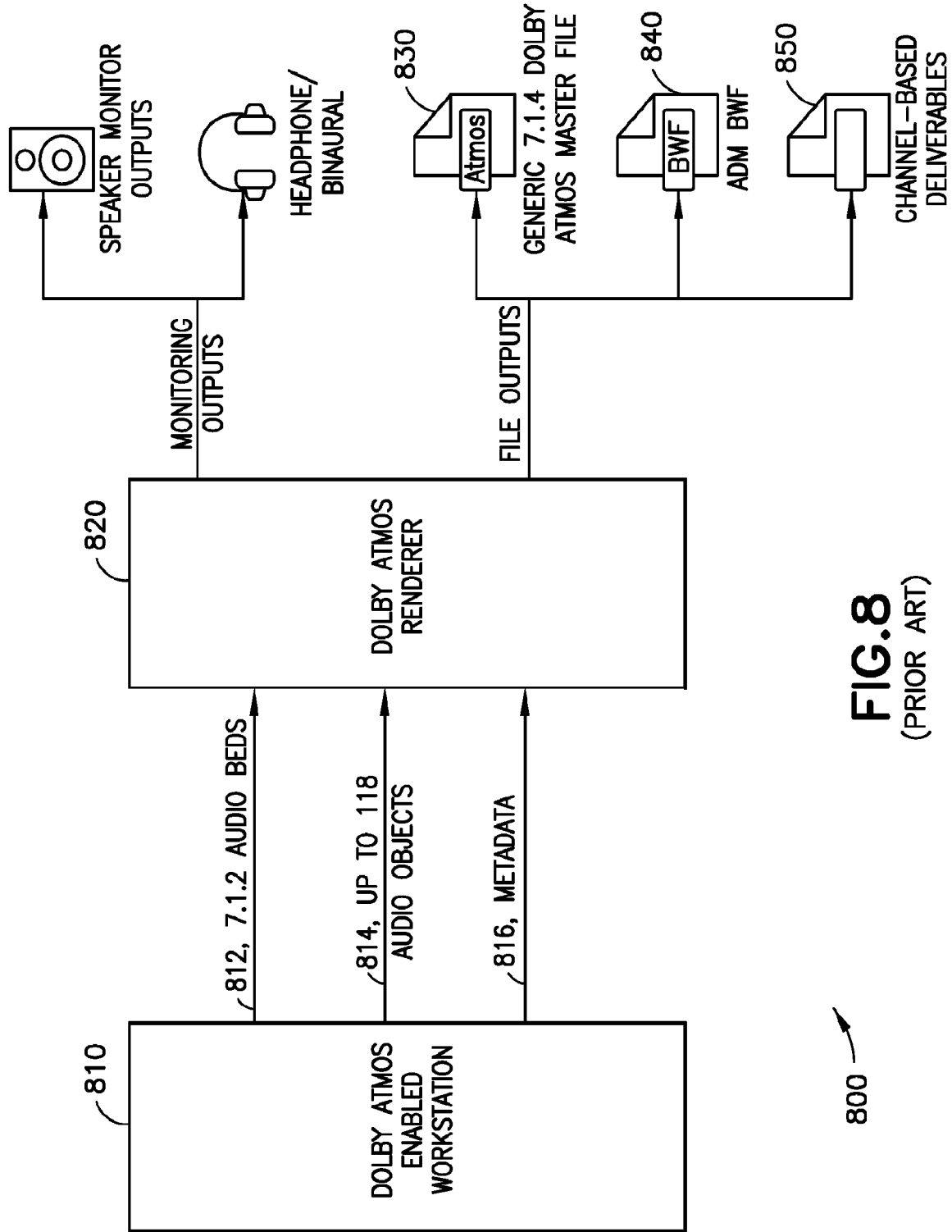
FIG. 8 is a schematic diagram of a prior art Dolby Atmos Renderer system.

The present embodiments include a method for processing audio profiles in an augmentation to the present Dolby Atmos Renderer system. The present Dolby Atmos Renderer system 800 is shown in FIG. 8 is used to create Dolby Atmos audio content. Dolby Atmos is a content creation, encoding, and delivery technology that provides immersive audio to consumers. Dolby Atmos uses audio objects to add elevation based content to ear level multi-channel audio. The Dolby Atmos Renderer is the central element of the Dolby Atmos mixing system that, in tandem with a DAW, generates the positional metadata that allows for the accurate spatial reproduction of an audio mix the playback environment. The Dolby Atmos Renderer system renders an Atmos mix appropriate to the user device and/or speaker configuration. Atmos is not an audio codec, but may be delivered by multiple codecs.

A digital audio workstation or DAW 810 (for example, a dedicated Mac or Windows computing system) using DAW software such as Avid Pro Tool and the Dolby Atmos Renderer software is typically used to create the soundtrack for the final mixed audio tracks. An audio mix combines many individual mono or stereo audio tracks into a target mix for any number of possible audio renderer configurations. The output of the mix may be configured for a simple two channel (stereo) mix or a more complex mix with support for as many as 64 speakers. The software used by the mix engineer contains various audio and special adjustments that may be made to affect the entire video soundtrack, or they may be adjusted scene-by-scene.

The default speaker configuration in a typical Dolby Atmos reference system with seven ear level speakers, a low frequency effect speaker, and four overhead (height) speakers. This configuration is also known as a 7.1.4 configuration.

Figures 11A, 11B:
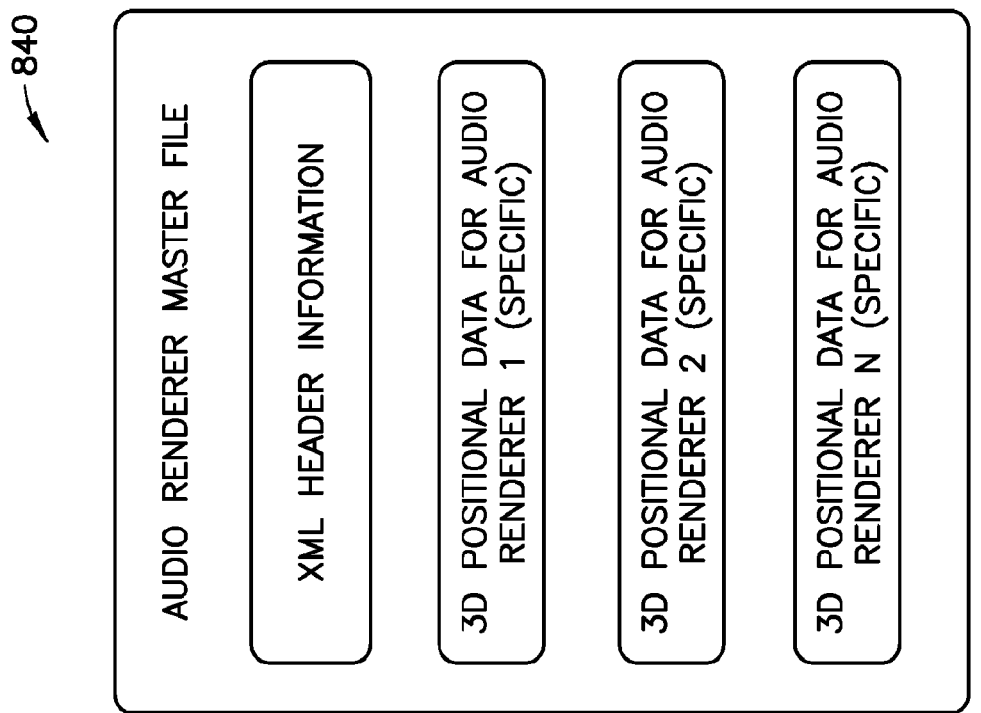
FIG. 11A is a diagram of an exemplary data structure for a Dolby Atmos master file.
FIG. 11B is a diagram of an exemplary data structure for an audio renderer master file.

Used in conjunction with the DAW, a Dolby Atmos Renderer 820 generates the positional metadata for Dolby Atmos playback. The Dolby Atmos Renderer takes as input, up 128 digital inputs including audio beds and objects with metadata and outputs audio for real time monitoring while mixing audio for video. The Dolby Atmos Renderer also creates a Dolby Atmos Master File (DAMF) 830 used for encoding the audio data for final distribution via streaming services or disc. An exemplary DAMF file is shown in FIG. 11A. The Dolby Atmos Master File contains the rendered audio data for the entire soundtrack using a generic 7.1.4 speaker configuration.

The DAMF is a collection of 3 files created by the Rendering Master Unit (RMU). The DAMF includes:

filename.atmos

The .atmos file is an xml file describing the names of filename.atmos.metadata and filename.atmos.audio (described below), the number of beds and objects being utilized, a start time (offset), a FFoA (first frame of action, often the same as the start time), a framerate, and other information.

filename.atmos.metadata

The .atmos.metadata is an xml file with spatial (xyz) and size coordinates for objects over time. These are large files.

filename.atmos.audio

The .atmos.audio is a Core Audio File (CAF) of up to 128 tracks. These files are the largest.

The Dolby Atmos renderer 820 produces an Audio Definition Model Broadcast Wave Format (ADM BWF) file 840, an example of which is shown in FIG. 11B. Online music services such as Apple Music require using an ADM BWF file format to submit a Dolby Atmos mix. The ADM BWF is essentially a .WAV audio file. The Dolby Atmos Renderer 820 generates channel-based outputs based on the current source material. The channel channel-based outputs are primarily used to derive stereo deliverables 850 for non-Dolby Atmos distribution. This allows projects to be mixed in Atmos without requiring a separate stereo mix.

The Dolby Atmos Renderer software provides a means for creating custom speaker layouts. The selected Audio Renderer Configuration may select a custom speaker configuration, gain, delay, and EQ in the DAW software to match a given Audio Renderer such as a Denon X4700H audio video receiver. These settings define a relationship between the original uncompressed audio tracks available only to the mix engineer at the time of mastering audio content for streaming and the audio rendering system available in the home of the end user at the time of playback. Different Audio Render Configurations are available for different audio renderers according to the corresponding audio renderer capabilities and available for the mix of the audio beds and objects.

Figure 9:
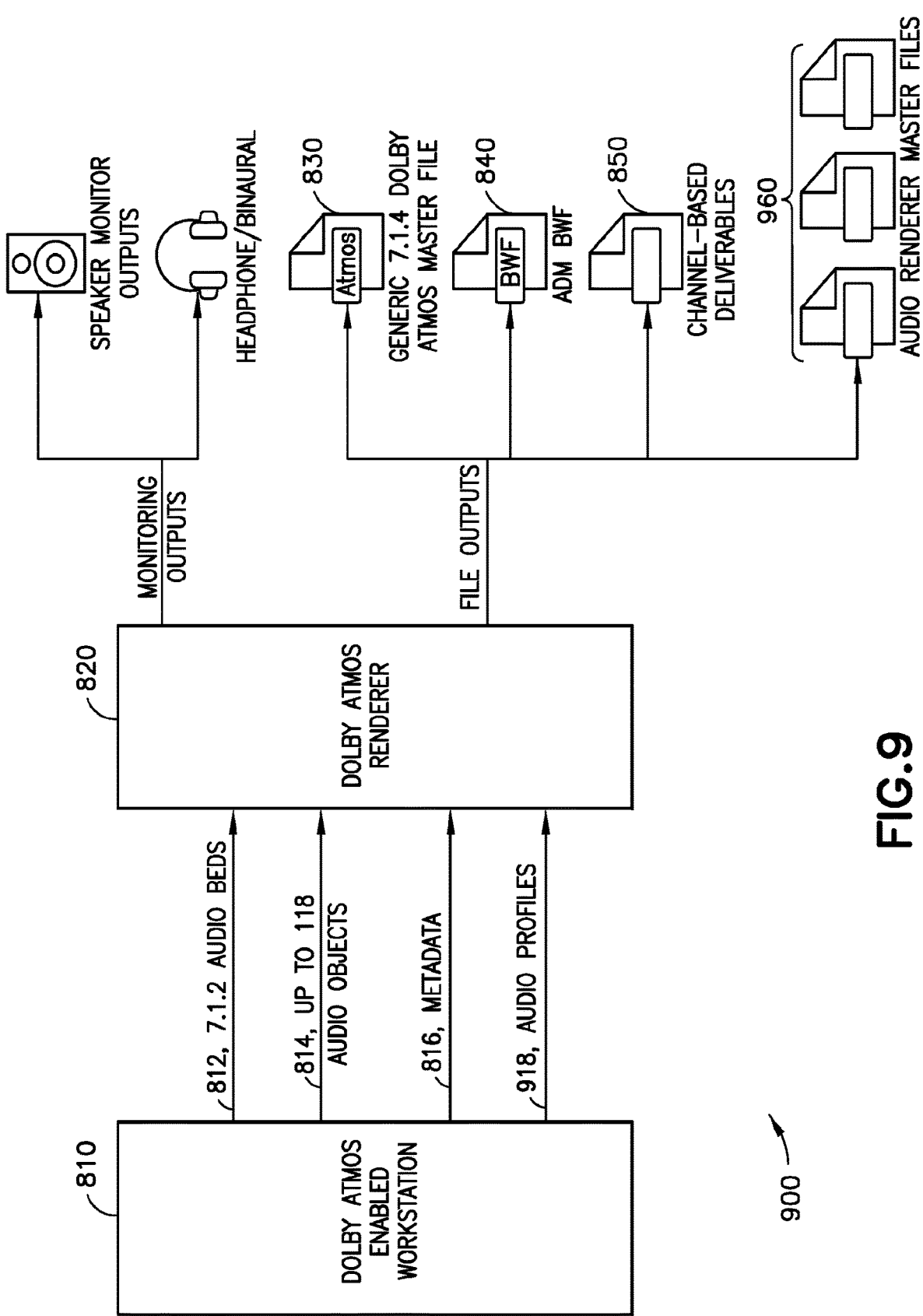
FIG. 9 is a schematic diagram of a Dolby Atmos Renderer system incorporating audio profiles of the present embodiments.

As shown by FIG. 9, the present embodiments provide improvements to the Dolby Atmos Renderer 820 to select output mixes that correspond to actual available audio renderers used in residential homes, not just a single generic 7.1.4 reference file 830. In addition, multiple file outputs 960 are saved which target specific audio rendering playback systems in consumer homes instead of the single generic 7.1.4 Dolby Atmos Master File 830.

The DAW 810 outputs the generic 7.1.4 Dolby Atmos Master file 830 and any number of Audio Render Master Files 960 which have a 1:1 relationship with the Audio Profiles 918 available for the Dolby Atmos Render. The resulting Dolby Atmos mixes in the audio renderer mater files 960 are optimized for a particular Audio Renderer and is based off the original uncompressed audio tracks. The mix engineer can select one or more Audio Renderer Configurations and output mixes specifically for different Audio Renderers that end users may have installed in their homes.

The streaming service provider makes available different mixes 960 for their subscribers and automatically delivers the appropriate audio profile along with the content, based on the subscriber's account preferences, which are setup to include a selection of supported Audio Renderers.

The Audio Renderer applies the Audio Profile which is embedded within the video stream to the playback system in real time as the movie and associated soundtrack are played in the end user's home. This results in a substantially improved listening experience than what is available to the general subscriber base.

Figure 10A:
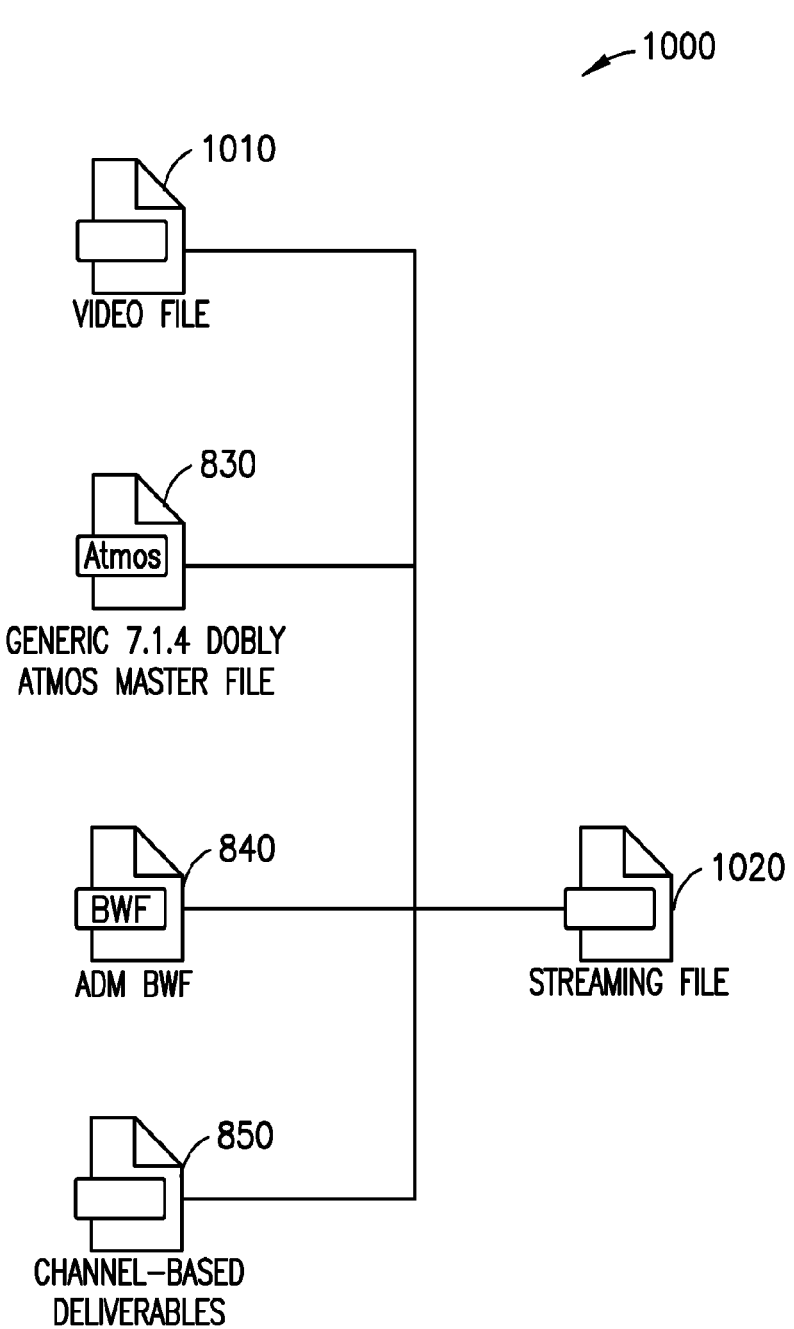
FIG. 10A is a schematic diagram showing a prior art audio/video delivery system (without Audio Profiles).

FIG. 10A shows what the prior delivery system 1000 looks like without Audio Profiles. The streaming file 1020 includes a video file 1010, and the audio/data files 830, 840, 850. Only generic 7.1.4 audio files 830 are included in the streaming file (video and audio) received by the user's audio rendering system. The streamed data is usually compressed video such as MP4 and compressed audio such as eAC3.

Figure 10B:
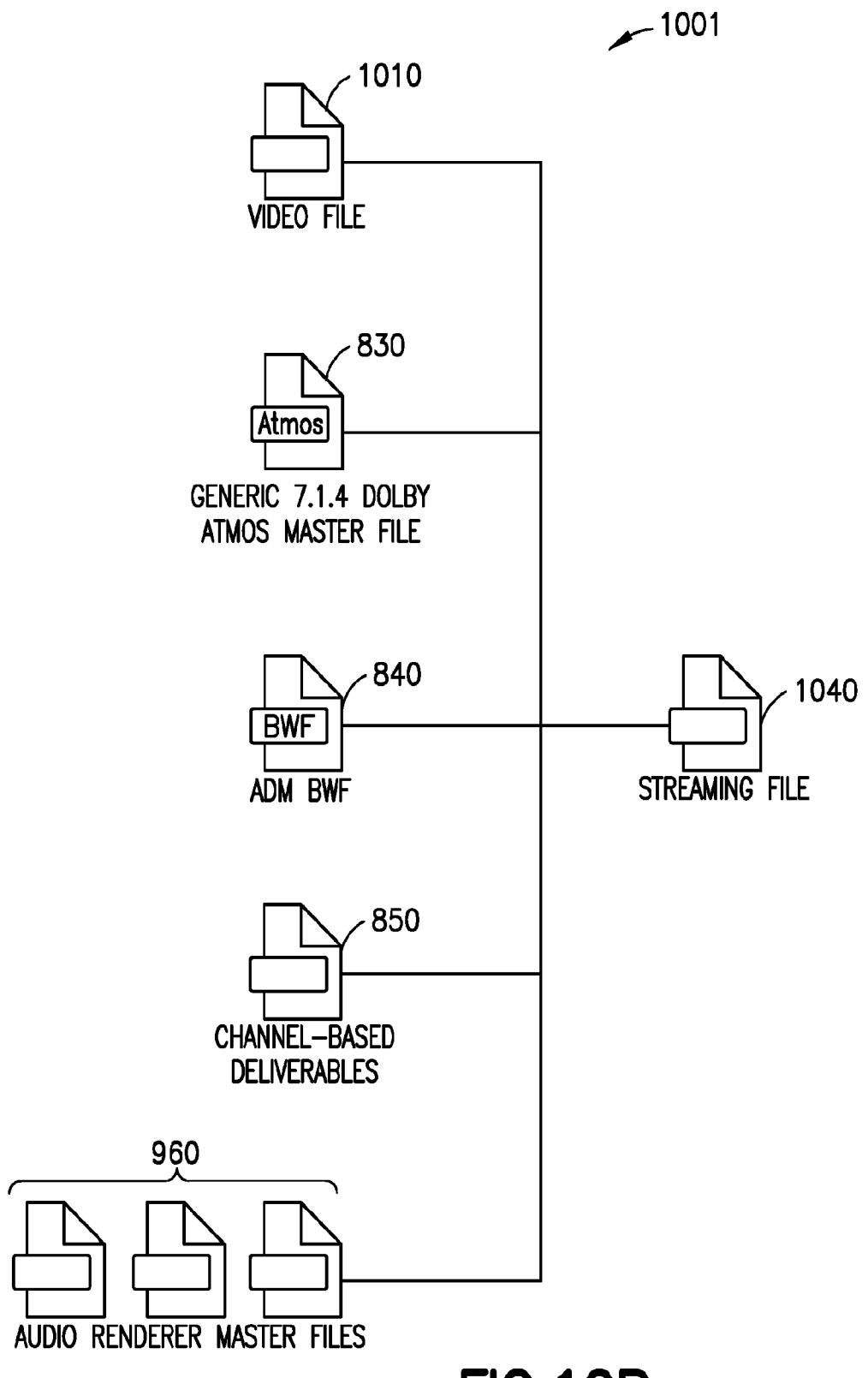
FIG. 10B is a schematic diagram showing an audio/video delivery system according to the present embodiments with Audio Profiles.

FIG. 10B shows the content delivered (streamed) in the streaming file 1040 under the present embodiments 1001. Here, the custom Audio Renderer audio files 960 are available in addition to the generic 7.1.4 audio files 830, 840, 850.

Figure 12:
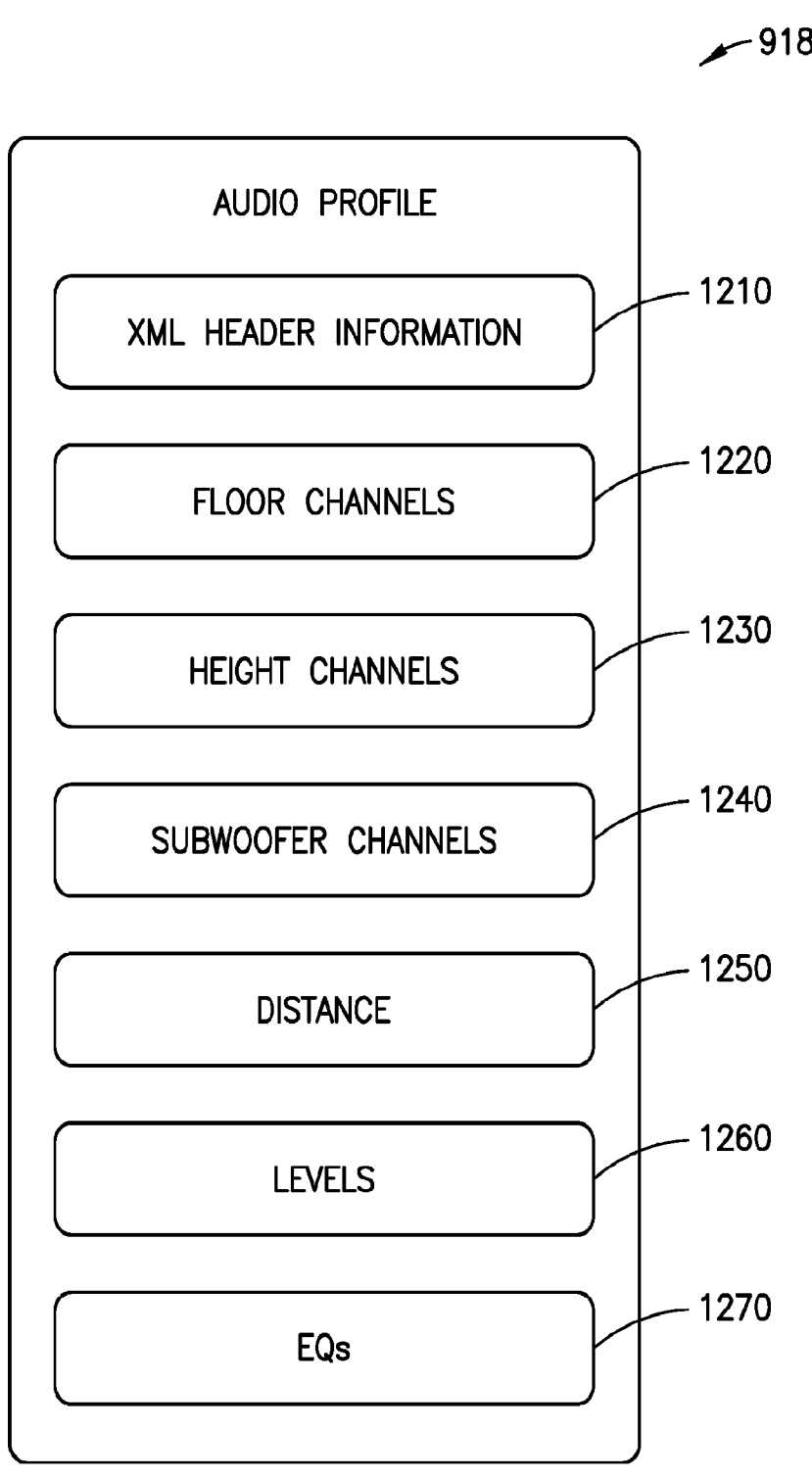
FIG. 12 is a diagram of an example of an audio profile data structure.

FIG. 12 is a diagram of an example of an audio profile data structure 918 including a plurality of data fields storing different types of parameters to be implemented by the home rendering system. The audio profile may include XML header information 1210, parameters regarding different speakers in a specific rendering system, for example, floor channels 1220, height channels 1230, and subwoofer channels. Other parameters may include distances 1250, for example, between specific speakers and the listener, levels 1260, and equalization parameters 1270.

Exemplary use cases for the present embodiments include the following:

User 1: I streamed the latest Marvel film, and it was amazing. I was thrilled I spent the extra $6.99 to access the exclusive audio content. It sounded like I was in Iron Man's suite!!

User 2: My friends came over to live stream XXY's latest concert. We all loved the way the "front row" package sounded and how it made you feel like you were at the arena. The lead singer even called out my girlfriend by name during the show! The "green room" post-concert zoom call was so cool, just the five of us having a virtual cocktail with the band.

User 3: I finally did it, I invested in the "new horizon" upgrade for my Marantz system. The software unleashed more power output and advanced optimization DSP that took the system to the next level. It was like buying a new system for only $100 bucks!

Audio profiles allow the audio system of the user to continuously make real-time adjustments to the audio reproduction system on a scene by scene (or even a frame by frame) basis so that every sound that is heard is optimized for the user listening environment and current scene in the movie. Audio profiles include data files delivered to a consumer along with the streaming audio and video content as embedded metadata, and are based on two high level data sources:

1. The audio tracks that accompany the video program (movie) as prepared by the mix engineer.

a. Movies are mixed by the engineer on one specific audio reproduction system in one specific mixing room at the studio that is not representative the consumer's home listening environment or equipment of most consumers.

b. The audio quality available to the mix engineer (original full bitrate multi-channel uncompressed audio) is better than what the customer receives at the playback side (compressed audio).

2. The capabilities and characteristics of the listening environment of the customer a. The audio reproduction system (speakers, amplifiers, digital processors, a/v switchers) and the characteristics of the physical listening environment (size and shape of the room, furniture, and the location or position in the room relative to audio speakers) are not considered by the mix engineer or audio system.

Not all scenes in a movie have the same audio requirements. For example, a quiet beach scene may be optimized differently from a loud action scene with explosions and carnage. The audio profile can target the customer's unique experience with optimized sound settings derived from not just the whole movie soundtrack as a single entity and one ideal playback system, but can be fine tuned and adjusted on a scene by scene basis for a particular scene in a movie with the target environment of the customer in mind. Currently a video program contains only one audio mix for the entire movie which is the same for all consumers regardless of their specific environment, available hardware, or personal preferences.

The attributes contained in the audio profiles (metadata) are applied to a matrix of sound settings available on the target audio reproduction system and optimized not just for an entire movie but each unique scene in the movie. This maximizes the audio performance on a scene-by-scene basis specifically tuned to the listening environment of the user beyond anything that is presently commercially available in a movie theater or home environment. All of this allows high performance and an unprecedented audio experience specifically customized for the listening environment of the user. Optionally, the same system may be implemented without the profile audio tracks from the mix engineer. Optionally, the system may add profile audio metadata from a third party source and merge it into the steaming content and synchronized with timing cues, scene changes, and running time calculations.

In alternative embodiments, the system may include audio preset profiles. For example, movies may have a high dynamic range such that a user can turn them up to hear the dialog and then an explosion wakes up others or disturbs them. Most users are unfamiliar with dynamic range compression (DRC) or have any desire for looking through menus to adjust. Some audio presets may be provided by the steaming video on demand (VOD) company for dialog enhancement or dynamic range reduction. For example, it could be suggested to turn on DRC after midnight etc. Or ask the parent: "Do you want to have DRC on always when your kid is signed in and watching kids' stuff." Different streaming providers may provide audio profile with characteristics to differentiate their services from their competitors. For example, a first provider may offer an audio profile providing more intelligible spoken dialog while a second provider may instead offer an audio profile with wider dynamic range that their competitors. Some streaming providers may have a default profile, while offering specialized profiles as an option.

Under a preferred embodiment, the audio profile may be embedded into and audio/video stream and extracted by the audio rendering system. Alternatively, an audio profile may be a file separate from the streamed content that is downloaded from the cloud to the on-board DSP on the audio product. This option relies on the user have appropriate equipment. Alternatively, a streaming profile provides individual user environments with individually tailored audio soundtracks. Similarly, the profile may be optimized for the most common and likely useful conditions for many users e.g., a DRC version, a voice enhanced version.

Figure 3:
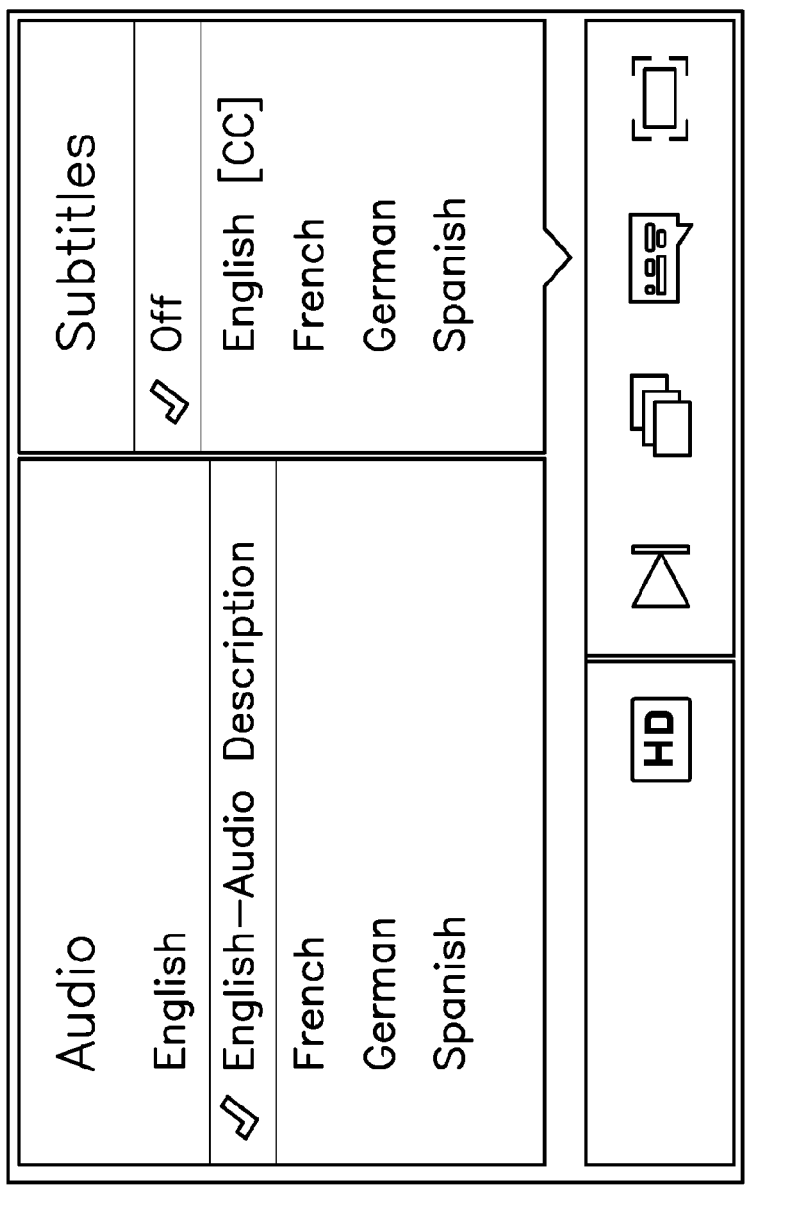
FIG. 3 is a representation of a user object providing user options for switching an audio type.

Some streaming service provide users with the option of switching the 'type' and language of audio they want to listen to while watching the film (e.g., 5.1, Dolby Atmos, 2 ch in Swedish), as shown in the FIG. 3. Therefore, the audio profile is presented as one of these options:

1. The audio profile is streamed to the user along with the video. Here, the audio profile is stored on the streaming services servers and is only available to the user while watching the video content.

2. The audio profile is an option that is selected by default depending on some 'attribute' that the streaming service or other party knows about the user (e.g., they have paid for the 'extra audio profile subscription' or 'we can detect their hardware is capable of rendering the audio profile').

To ensure that the audio and video content are synchronized, and considering the above two assumptions, then synchronization could be managed by the services and would be dependent on the user's bandwidth aspects. In the video context, for example, if the bandwidth at the time of playback is insufficient, the service degrades the picture quality to ensure that playback is not stilted or stops. The same technique may be applied to ensure optimum audio-video content delivery. Technology companies are working towards better codecs that provide more efficient compression in order to battle the bandwidth issues, particularly with the imminent rise of 8K video, which without better compression, puts significantly higher demand on bandwidth, and may be a key battle ground for streaming service. However, the above assumes that the audio profile is high-resolution (i.e., more data heavy) rather than having some other attributes that improve the movie experience. For example, the audio profile may be the same resolution as existing options but specially tuned for particular hardware. In addition, synchronization techniques used for different spoken languages may be adapted and scaled to allow for different quality timing adjustments and EQ.

Aspects of the above described embodiments may be implemented as a "Cinematic Mode" as follows. Streaming video platforms (and TV producer) and receive a solution to capture most of the original audio content. Users receive this premium feature, for example, via subscription model. This Cinema Mode may be enabled via TV platform (for users with only sound from TV speakers), or via users of a particular platform (for example, sound bars or AVRs). Of course, the quality of Cinematic Mode varies according to the audio capabilities of the respective TV, sound bar, or AVR. This Cinematic Mode may involve, for example cooperation with original content producers, and TV and audio system manufactures regarding both software and hardware aspects.

Figure 4:
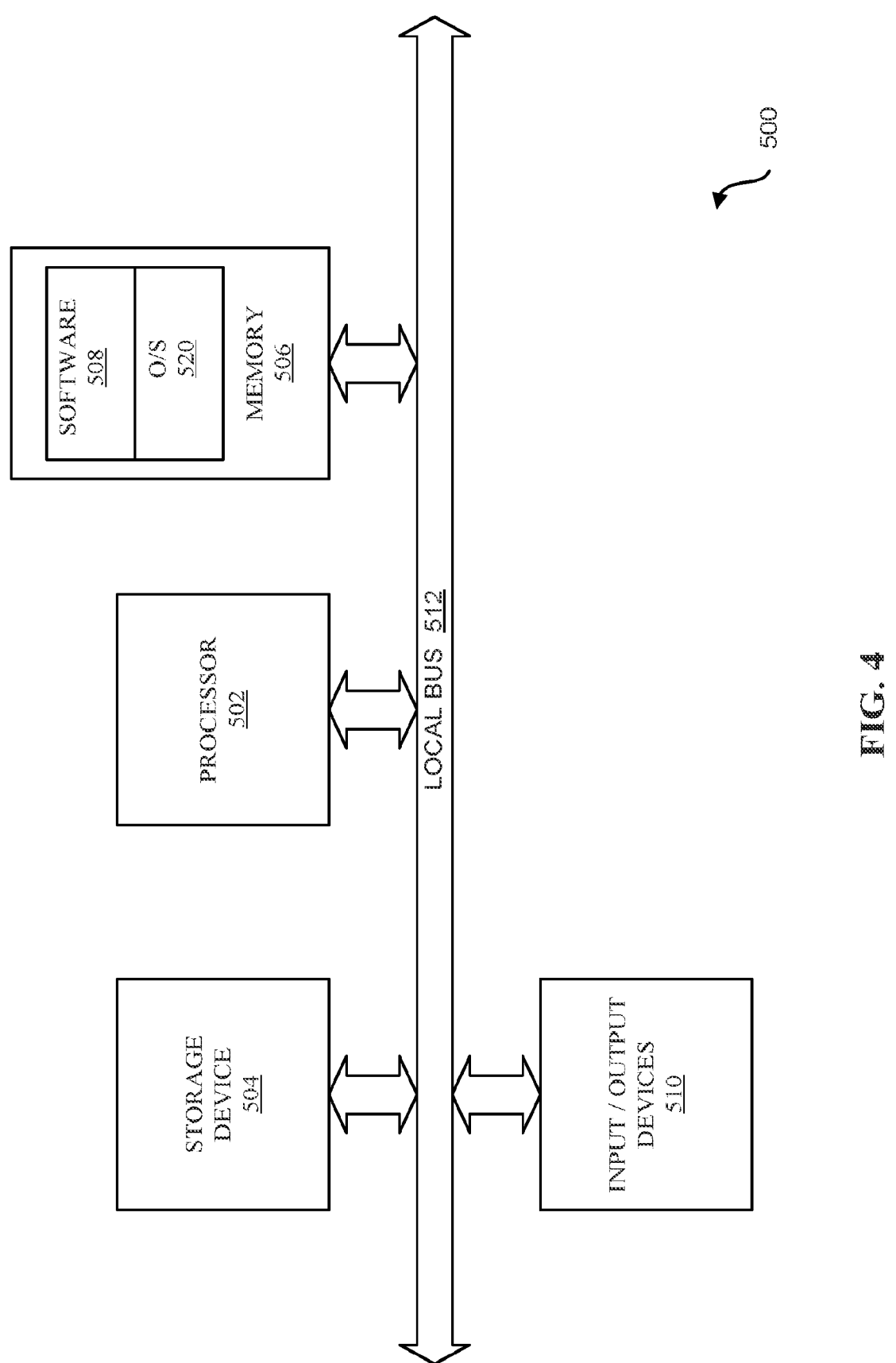
FIG. 4 is a schematic diagram illustrating an example of a system for executing functionality of the present invention.

The present system for executing the functionality described in detail above may be a computer, an example of which is shown in the schematic diagram of FIG. 4. The system 500 contains a processor 502, a storage device 504, a memory 506 having software 508 stored therein that defines the abovementioned functionality, input, and output (I/O) devices 510 (or peripherals), and a local bus, or local interface 512 allowing for communication within the system 500. The local interface 512 can be, for example but not limited to, one or more buses or other wired or wireless connections, as is known in the art. The local interface 512 may have additional elements, which are omitted for simplicity, such as controllers, buffers (caches), drivers, repeaters, and receivers, to enable communications. Further, the local interface 512 may include address, control, and/or data connections to enable appropriate communications among the aforementioned components.

The processor 502 is a hardware device for executing software, particularly that stored in the memory 506. The processor 502 can be any custom made or commercially available single core or multi-core processor, a central processing unit (CPU), an auxiliary processor among several processors associated with the present system 500, a semiconductor based microprocessor (in the form of a microchip or chip set), a macroprocessor, or generally any device for executing software instructions.

The memory 506 can include any one or combination of volatile memory elements (e.g., random access memory (RAM, such as DRAM, SRAM, SDRAM, etc.)) and nonvolatile memory elements (e.g., ROM, hard drive, tape, CDROM, etc.). Moreover, the memory 506 may incorporate electronic, magnetic, optical, and/or other types of storage media. Note that the memory 506 can have a distributed architecture, where various components are situated remotely from one another, but can be accessed by the processor 502.

The software 508 defines functionality performed by the system 500, in accordance with the present invention. The software 508 in the memory 506 may include one or more separate programs, each of which contains an ordered listing of executable instructions for implementing logical functions of the system 500, as described below. The memory 506 may contain an operating system (O/S) 520. The operating system essentially controls the execution of programs within the system 500 and provides scheduling, input-output control, file and data management, memory management, and communication control and related services.

The I/O devices 510 may include input devices, for example but not limited to, a keyboard, mouse, scanner, microphone, etc. Furthermore, the I/O devices 510 may also include output devices, for example but not limited to, a printer, display, speakers, etc. The I/O devices may be connected to the system 500 by various means, for example, via USB, Optical, or HDMI connections. Finally, the I/O devices 510 may further include devices that communicate via both inputs and outputs, for instance but not limited to, a modulator/demodulator (modem; for accessing another device, system, or network), a radio frequency (RF) or other transceiver, a telephonic interface, a bridge, a router, or other device.

When the system 500 is in operation, the processor 502 is configured to execute the software 508 stored within the memory 506, to communicate data to and from the memory 506, and to generally control operations of the system 500 pursuant to the software 508, as explained above.

When the functionality of the system 500 is in operation, the processor 502 is configured to execute the software 508 stored within the memory 506, to communicate data to and from the memory 506, and to generally control operations of the system 500 pursuant to the software 508. The operating system 520 is read by the processor 502, perhaps buffered within the processor 502, and then executed.

When the system 500 is implemented in software 508, it should be noted that instructions for implementing the system 500 can be stored on any computer-readable medium for use by or in connection with any computer-related device, system, or method. Such a computer-readable medium may, in some embodiments, correspond to either or both the memory 506 or the storage device 504. In the context of this document, a computer-readable medium is an electronic, magnetic, optical, or other physical device or means that can contain or store a computer program for use by or in connection with a computer-related device, system, or method. Instructions for implementing the system can be embodied in any computer-readable medium for use by or in connection with the processor or other such instruction execution system, apparatus, or device. Although the processor 502 has been mentioned by way of example, such instruction execution system, apparatus, or device may, in some embodiments, be any computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the processor or other such instruction execution system, apparatus, or device.

Such a computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted, or otherwise processed in a suitable manner if necessary, and then stored in a computer memory.

In an alternative embodiment, where the system 500 is implemented in hardware, the system 500 can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Figure 5:
FIG. 5 is a schematic diagram for an exemplary embodiment of an Audio Profile Distribution System.

FIG. 5 is a schematic block diagram of an exemplary audio profile distribution system 400. An audio renderer 410, for example, a home audio entertainment receiver is connected to the internet or other broadband network. For example, the audio renderer 410 may be integral to a soundbar or AVR or active speaker.

The audio renderer 410 sends a first digital selection command signal 411 to a third party video streaming server 420, for example via an internet connection, to select the video content and/or accompanying audio profile. The third party video streaming server 420 may host streaming content by a third party, for example Netflix. The third party video streaming server 420 sends a second digital selection command signal 421 to the audio profile server 430 via an internet connection to communicate the audio profile the user has selected and/or provide video sync information to the audio profile processor. For example, the second digital selection may be directed to a higher quality audio streams from the standard audio streams, for example, provided by a server configured to provide higher bandwidth audio and/or video streams.

The audio renderer 410 sends a third digital selection command signal 412 to the audio profile server 430 to select the audio profile (if not already selected via the first digital selection command signal 411). The audio profile server 430 processes the audio profiles and sends these digital audio signals to the user's home entertainment receiver via a digital audio profile signal 438, for example, the signals may be embedded as metadata in the streamed audio data.

The audio profile server 430 includes a customer input request module 431 that sends video sync information, user audio profile selection information, and/or user calibration data if collected via a digital signal 432 to an audio profile processing unit 433 that processes and, in some instances, selects audio profiles from system storage, utilizes user calibration data to optimize profiles, utilizes equalization, utilizes filtering, utilizes delay and gain adjustments, and sends a digital audio profile signal out for the user's audio system.

System storage 436 communicates with the audio processing module via a signal 434, and stores audio profiles, user data, and audio signal modification parameters.

An audio profile signal output module 437 receives a signal 435 from the audio profile processing module 433 and sends a wired or wireless digital signal 438 to the audio renderer 410.

FIG. 6 is a flowchart for a first exemplary method embodiment for Audio Profile Distribution. The user initializes their internet connection and home audio entertainment system, as shown by block 610. The user selects video content and an audio profile is paired with the video content to begin their session, as shown by block 620. The user may select an option where the system chooses the audio profile based on a user profile indicating the user audio rendering equipment and/or preferences. The audio profile is either downloaded from the audio profile server or streamed from the audio profile server to the user's home audio entertainment receiver, as shown by block 630. The user repeats block 620 for any additional content selections, as shown by block 640.

FIG. 7 is a flowchart for a second exemplary method embodiment for Audio Profile Distribution. The user initializes their internet connection and home audio entertainment system, as shown by block 710. The user initializes a calibration sequence, as shown by block 720. The calibration data is sent to the audio profile processing unit, as shown by block 730. The user selects video content, and an audio profile is paired with the video content to begin the user session, as shown by block 740. As noted above, the user may opt to have the system select the audio profile based on stored user profile information. The audio profile processing unit processes the calibration data and optimizes the audio profile utilizing parametric equalization, filtering, delay adjustments, and gain adjustments for each channel in the user's system, as shown by block 750. The audio profile is either downloaded from the audio profile server or streamed from the audio profile server to the user's home audio entertainment receiver, as shown by block 760. Block 740 may be repeated for any additional content selections, as shown by block 770.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A system for providing an audio profile for streaming video, comprising:
   an audio profile subsystem configured to receive audio mix data and synchronize the audio mix data in an audio profile;
   a streaming service video streaming server configured to receive video data, uncompressed audio data synchronized with audio tracks from a plurality of audio render files, and the audio profile;
   an audio profile server configured to receive the audio profile and dynamic range compression descriptors to produce audio profile metadata; and
   an audio rendering system configured to receive audio profile metadata and listening environment parameters to adjust audio parameters based on the audio rendering system's characteristics and a listening environment of the audio rendering system,
   wherein the audio parameters comprise one or more of the group consisting of equalization, a filter, a rendering delay, and volume.

2. The system of claim 1, wherein the audio reproduction system is further configured to send a first digital selection command signal to the video streaming server to select video content and/or the audio profile.

3. The system of claim 2 wherein the video streaming server is configured to send a second digital selection command signal to the audio profile server, wherein the second digital selection command signal communicate an audio profile selection and/or video synchronization information.

4. The system of claim 2, wherein the audio reproduction system is further configured to provide another digital selection command signal to the audio profile server in order to select the audio profile.

5. The system of claim 3, wherein the audio profile selection identifies a selected audio stream having a higher audio bandwidth than a default audio stream.

6. The system of claim 3, wherein the audio profile server further comprises:
   a customer request module configured to receive the second digital selection command signal; and
   an audio profile processing unit configured to receive video synchronization information, user audio profile selection information, and/or user calibration data from the customer request module and process and/or select an audio profile.

7. The system of claim 1, wherein the audio profile server is configured to adjust an audio stream according to the audio profile, and transmit the audio stream to the audio reproduction system.

8. The system of claim 1, wherein one or more optimizations, for one or more specific audio renderers of the audio rendering system, are with the video data in addition to or instead of a generic audio output for playback on any general audio renderer.

9. The system of claim 1, wherein audio customizations, for one or more specific audio renderers of the audio rendering system, are applied during a mix that produces the audio mix data, so that audio enhancements are applied to the uncompressed audio data.

10. The system of claim 1, wherein the audio profile is tailored to specific capabilities of the audio rendering system.

11. A computer based method for providing streamed audio content to accompany streamed video content, comprising the steps of:

providing an audio render file and a plurality of audio mixes within an audio render file for the video content, wherein each audio mix of the plurality of audio mixes within the audio render file is mixed according to a specified audio reproduction system of a plurality of specified audio reproduction systems and a configuration of the specified audio reproduction system;

receiving a request for the streamed video, wherein the request comprises an identifier of one of the plurality of specified audio reproduction systems;

selecting the audio mix of the plurality of audio mixes within the audio render file according to the identifier; and streaming the video content and the selected audio mix.

12. The method of claim 11, wherein the selected audio mix of the plurality of audio mixes within the audio render file comprises a plurality of mix settings, each of the plurality of mix settings corresponding to one or more scenes of the video content.

13. The method of claim 12, wherein the selected audio mix of the plurality of audio mixes within the audio render file further comprises timing information between each of the plurality of mix settings-corresponding to one or more scenes of the video content.

14. The method of claim 11, wherein the selected audio mix of the plurality of audio mixes within the audio render file corresponds to an audio profile providing dialog enhancement.

15. The method of claim 11, wherein the selected audio mix of the plurality of audio mixes within the audio render file corresponds to an audio profile providing dynamic range reduction or dynamic range compression or a widened dynamic range.

16. A non-transitory computer-readable medium storing instructions, which when executed by one or more processors, cause the one or more processors to perform a method, the method comprising:

providing a plurality of audio mixes within an audio render file for the video content, wherein each audio mix of the plurality of audio mixes is mixed according to a specified audio reproduction system;

receiving a request for the streamed video, wherein the request comprises an identifier of one of the plurality of specified audio reproduction systems;

selecting the audio mix of the plurality of audio mixes within the audio render file according to the identifier; and streaming the video content and the selected audio mix.

17. The non-transitory computer-readable medium of claim 16, wherein the selected audio mix of the plurality of audio mixes within the audio render file comprises a plurality of mix settings, each of the plurality of mix settings corresponding to one or more scenes of the video content.

18. The non-transitory computer-readable medium of claim 17, wherein the selected audio mix of the plurality of audio mixes within the audio render file further comprises timing information between each of the plurality of mix settings, the corresponding one or more scenes of the video content.

19. The non-transitory computer-readable medium of claim 16, wherein the selected audio of the plurality of audio mixes within the audio render file corresponds to an audio profile providing dialog enhancement.

20. The non-transitory computer-readable medium of claim 16, wherein the selected audio mix of the plurality of audio mixes within the audio render file corresponds to an audio profile providing dynamic range reduction or dynamic range compression or a widened dynamic range.

\* \* \* \* \*